(12) United States Patent
Chen et al.

(10) Patent No.: US 11,544,611 B2
(45) Date of Patent: Jan. 3, 2023

(54) QUANTUM COMPUTATION OF MOLECULAR EXCITED STATES IN THE PRESENCE OF HAMILTONIAN SYMMETRIES

(71) Applicant: International Business Machines Corporation, Armonk, NY (US)

(72) Inventors: Richard Chen, Mount Kisco, NY (US); Antonio Mezzacapo, Westchester, NY (US); Marco Pistoia, Amawalk, NY (US); Pauline Ollitrault, Zurich (CH); Ivano Tavernelli, Wädenswil (CH); Jay M. Gambetta, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1001 days.

(21) Appl. No.: 16/218,085

(22) Filed: Dec. 12, 2018

(65) Prior Publication Data
US 2020/0193319 A1 Jun. 18, 2020

(51) Int. Cl.
*G06N 10/00* (2022.01)
*G06F 17/11* (2006.01)
*G06F 17/16* (2006.01)

(52) U.S. Cl.
CPC ............. *G06N 10/00* (2019.01); *G06F 17/11* (2013.01); *G06F 17/16* (2013.01)

(58) Field of Classification Search
CPC .......... G06N 10/00; G06F 17/11; G06F 17/16
(Continued)

(56) References Cited

U.S. PATENT DOCUMENTS 7,529,717 B2   5/2009  Vala et al.
9,819,347 B2   11/2017 Hastings et al.
(Continued)

OTHER PUBLICATIONS

Nikolaj Moll et al., "Quantum optimization using variational algorithms on near-term quantum devices", Jun. 19, 2018, Quantum Science and Technology 3.3, 030503, pp. 1-17.*
(Continued)

*Primary Examiner* — Juan C Ochoa
(74) *Attorney, Agent, or Firm* — Amin, Turocy & Watson, LLP

(57) ABSTRACT

Techniques regarding quantum computation of molecular excited states are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise an initialization component that can categorize a plurality of excited operators from a mapped qubit Hamiltonian into sectors based on a commutation property of the plurality of excited operators with a symmetry from the mapped qubit Hamiltonian. The computer executable components can also comprise a matrix component that can generate an equation of motion matrix from an excited operator from the plurality of excited operators based on the sectors categorized by the initialization component.

25 Claims, 11 Drawing Sheets

(58) Field of Classification Search
USPC .................................................. 703/2; 706/45
See application file for complete search history.

(56) References Cited

U.S. PATENT DOCUMENTS

| | | |
|---|---|---|
| 10,007,884 B2 | 6/2018 | Alboszta et al. |
| 10,311,370 B2 * | 6/2019 | Bravyi .................. G06N 10/00 |
| 2011/0313741 A1 | 12/2011 | Langhoff |
| 2016/0283857 A1 | 9/2016 | Babbush et al. |
| 2018/0053112 A1 | 2/2018 | Bravyi et al. |
| 2018/0240035 A1 | 8/2018 | Scheer et al. |
| 2018/0267933 A1 | 9/2018 | Lanting |

OTHER PUBLICATIONS

D. J. Rowe, Equations-of-motion method and the extended shell model, 1968, Rev. Mod. Phys. 40, 153, pp. 153-166.*

Quantum computing, Wikipedia, printed Dec. 1, 2021, pp. 1-25.*

Ganzhorn, M., et al. "Gate-efficient simulation of molecular eigenstates on a quantum computer." arXiv:1809.05057. Sep. 13, 2018. 20 pages.

Bravyi, Sergey, et al. "Tapering off qubits to simulate fermionic Hamiltonians." arXiv:1701.08213. Jan. 31, 2017. 15 pages.

Mell, Peter, et al. "The NIST Definition of Cloud Computing." National Institute of Standards and Technology. Sep. 2011. 7 pages.

International Search Report and Written Opinion received for PCT Application Serial No. PCT/EP2019/082773 dated Mar. 11, 2020, 16 pages.

* cited by examiner

702 — CATEGORIZING, BY A SYSTEM OPERATIVELY COUPLED TO A PROCESSOR, A PLURALITY OF EXCITED OPERATORS FROM A MAPPED QUBIT HAMILTONIAN INTO SECTORS BASED ON A COMMUTATION PROPERTY OF THE PLURALITY OF EXCITED OPERATORS WITH A SYMMETRY FROM THE MAPPED QUBIT HAMILTONIAN

704 — GENERATING, BY THE SYSTEM, AN EQUATION OF MOTION MATRIX FROM AN EXCITED OPERATOR FROM THE PLURALITY OF EXCITED OPERATORS BASED ON THE CATEGORIZING

- 802 — CATEGORIZING, BY A SYSTEM OPERATIVELY COUPLED TO A PROCESSOR, A PLURALITY OF EXCITED OPERATORS FROM A MAPPED QUBIT HAMILTONIAN INTO SECTORS BASED ON A COMMUTATION PROPERTY OF THE PLURALITY OF EXCITED OPERATORS WITH A SYMMETRY FROM THE MAPPED QUBIT HAMILTONIAN

- 804 — GENERATING, BY THE SYSTEM, AN EQUATION OF MOTION MATRIX FROM AN EXCITED OPERATOR FROM THE PLURALITY OF EXCITED OPERATORS BASED ON THE CATEGORIZING, WHEREIN THE EQUATION OF MOTION MATRIX IS BASED ON A FIRST PAIR OF EXCITED OPERATORS CATEGORIZED INTO A FIRST SECTOR

- 806 — GENERATING, BY THE SYSTEM, A COMMUTATOR BASED ON THE EQUATION OF MOTION MATRIX

- 808 — TAPERING, BY THE SYSTEM, A NUMBER OF QUBITS THAT EXECUTE THE COMMUTATOR BASED ON A TAPERING VALUE THAT REGARDS THE LOCATION OF A REFERENCE STATE OF THE MAPPED QUBIT HAMILTONIAN IN RELATION TO THE SYMMETRY

- 810 — SOLVING, BY THE SYSTEM, AN EIGENVALUE EQUATION BASED ON THE COMMUTATOR

QUANTUM COMPUTATION OF MOLECULAR EXCITED STATES IN THE PRESENCE OF HAMILTONIAN SYMMETRIES

BACKGROUND

The subject disclosure relates to quantum computation of molecular excited states, and more specifically, autonomous quantum computation of molecular excited states in the presence of Hamiltonian symmetries.

The computation of molecular excited state energies can be an important problem in electronic structure. The equation of motion ("EoM") method is one of the leading approaches to compute molecular excited states on classical computers. To compute the molecular excited state energies of a molecule, the EoM method builds a plurality of matrices whose size can grow quadratically in the number of excited states one wants to consider. The EoM method can be efficiently mapped on a quantum computer, using the latter to compute averages of the elements of the matrices used to compute the excited state energies.

However, despite the faster computation processing that can be provided by quantum computing, conventional techniques using the EoM method still scale the matrices quadratically in the number of excited states considered. The quadratic scaling can result in a high requirement for quantum computing resources and/or the use of numerous qubits. For example, conventional EoM methods applied on a quantum computing device can require a large number of qubits for execution; thereby, rendering operation of quantum circuits with a large number of gates more difficult.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate quantum computation of molecular excited states are described.

According to an embodiment, a system is provided. The system can comprise a memory that can store computer executable components. The system can also comprise a processor, operably coupled to the memory, and that can execute the computer executable components stored in the memory. The computer executable components can comprise an initialization component that can categorize a plurality of excited operators from a mapped qubit Hamiltonian into sectors based on a commutation property of the plurality of excited operators with a symmetry from the mapped qubit Hamiltonian. The computer executable components can also comprise a matrix component that can generate an equation of motion matrix from an excited operator from the plurality of excited operators based on the sectors categorized by the initialization component. An advantage of such a system can be the use of Hamiltonian symmetries to reduce computational requirements of equation of motion determination methods.

In some examples, a first sector from the sectors can comprise a first pair of excited operators from the plurality of excited operators. The first pair of excited operators can commute with the symmetry, and a second sector from the sectors can comprise a second pair of excited operators from the plurality of excited operators. Also, the second pair of excited operators anti-commute with the symmetry. An advantage of such a system can be a reduction in computational redundancies when computing molecular excited states.

According to an embodiment, a computer-implemented method is provided. The computer-implemented method can comprise categorizing, by a system operatively coupled to a processor, a plurality of excited operators from a mapped qubit Hamiltonian into sectors based on a commutation property of the plurality of excited operators with a symmetry from the mapped qubit Hamiltonian. The computer-implemented method can also comprise generating, by the system, an equation of motion matrix from an excited operator from the plurality of excited operators based on the categorizing. An advantage of such a computer-implemented method can be a reduction in the number of qubits to run an equation of motion method on a quantum computer.

In some examples, the first sector from the sectors can comprise a first pair of excited operators from the plurality of excited operators. The first pair of excited operators can commute with the symmetry, and a second sector from the sectors can comprise a second pair of excited operators from the plurality of excited operators. Also, the second pair of excited operators can anti-commute with the symmetry. Further, the computer-implemented method can comprise generating, by the system, a second equation of motion matrix in the second sector based on the second pair of excited operators. Also, generating the equation of motion matrix can be based on the first pair of excited operators. An advantage of such a computer-implemented method can be that it can be easier than conventional methods to run quantum circuits with a large number of gates; thereby enabling the exploration of complex wavefunction ansatzes in a variational quantum eigensolver approach.

According to an embodiment, a computer program product for quantum computation of a molecular excited state in a presence of a Hamiltonian symmetry is provided. The computer program product can comprise a computer readable storage medium having program instructions embodied therewith. The program instructions can be executable by a processor to cause the processor to categorize, by a system operatively coupled to the processor, a plurality of excited operators from a mapped qubit Hamiltonian into sectors based on a commutation property of the plurality of excited operators with a symmetry from the mapped qubit Hamiltonian. The program instructions can also cause the processor to generate, by the system, an equation of motion matrix from an excited operator from the plurality of excited operators based on a categorization of the plurality of excited operators into the sectors. An advantage of such a computer program product can be a reduction in the number of evaluations of matrix elements to build matrices in the context of the equation of motion method.

In some examples, the program instructions can further cause the processor to generate, by the system, a commutator based on the equation of motion matrix. Also, the program instructions can cause the processor to taper, by the system, a number of qubits that can execute the commutator based on a tapering value that can regard a location of a reference state of the mapped qubit Hamiltonian in relation to the symmetry. An advantage of such a computer program product can be the reduction quantum computing resources to execute equation of motion methods.

According to an embodiment, a system is provided. The system can comprise a memory that can store computer executable components. The system can also comprise a processor, operably coupled to the memory, and that can execute the computer executable components stored in the memory. The computer executable components can comprise a control component that can generate an equation of motion matrix from a pair of excited operators from a mapped qubit Hamiltonian based on a symmetry that is intrinsic to the mapped qubit Hamiltonian. An advantage of such a system can be the preparation of one or more matrices for the computation of an equation of motion while minimizing the use of computational resources.

In some examples, the system can also comprise an initialization component that can categorize the pair of excited operators into sectors based on a commutation property of the pair of excited operators with the symmetry. An advantage of such a system can be that the system can avoid computing matrix elements that would render a known result (e.g., zero).

According to an embodiment, a computer program product for quantum computation of a molecular excited state in a presence of a Hamiltonian symmetry is provided. The computer program product can comprise a computer readable storage medium having program instructions embodied therewith. The program instructions can be executable by a processor to cause the processor to generate, by a system operatively coupled to the processor, an equation of motion matrix from a pair of excited operators from a mapped qubit Hamiltonian based on the Hamiltonian symmetry, which is intrinsic to the mapped qubit Hamiltonian. An advantage of such a computer program product can be the autonomous quantum computation of one or more equation of motion matrices using reduced computer resources, as compared to the prior art.

In some examples, the program instructions can also cause the processor to categorize, by the system, the pair of excited operators into sectors based on a commutation property of the pair of excited operators with the symmetry. Also, a first excited operator from the pair of excited operators and a second excited operator from the pair of excited operators can be categorized, by the system, into a first sector from the sectors. An advantage of such a computer program product can be the use of an intrinsic symmetry property to increase computational efficiency of an equation of motion.

BRIEF DESCRIPTION OF THE DRAWINGS

FIG. 7 illustrates a flow diagram of an example, non-limiting method that can facilitate quantum computation of molecular excited states in the presence of Hamiltonian symmetries in accordance with one or more embodiments described herein.

FIG. 8 illustrates a flow diagram of an example, non-limiting method that can facilitate quantum computation of molecular excited states in the presence of Hamiltonian symmetries in accordance with one or more embodiments described herein.

DETAILED DESCRIPTION

Figure 1:
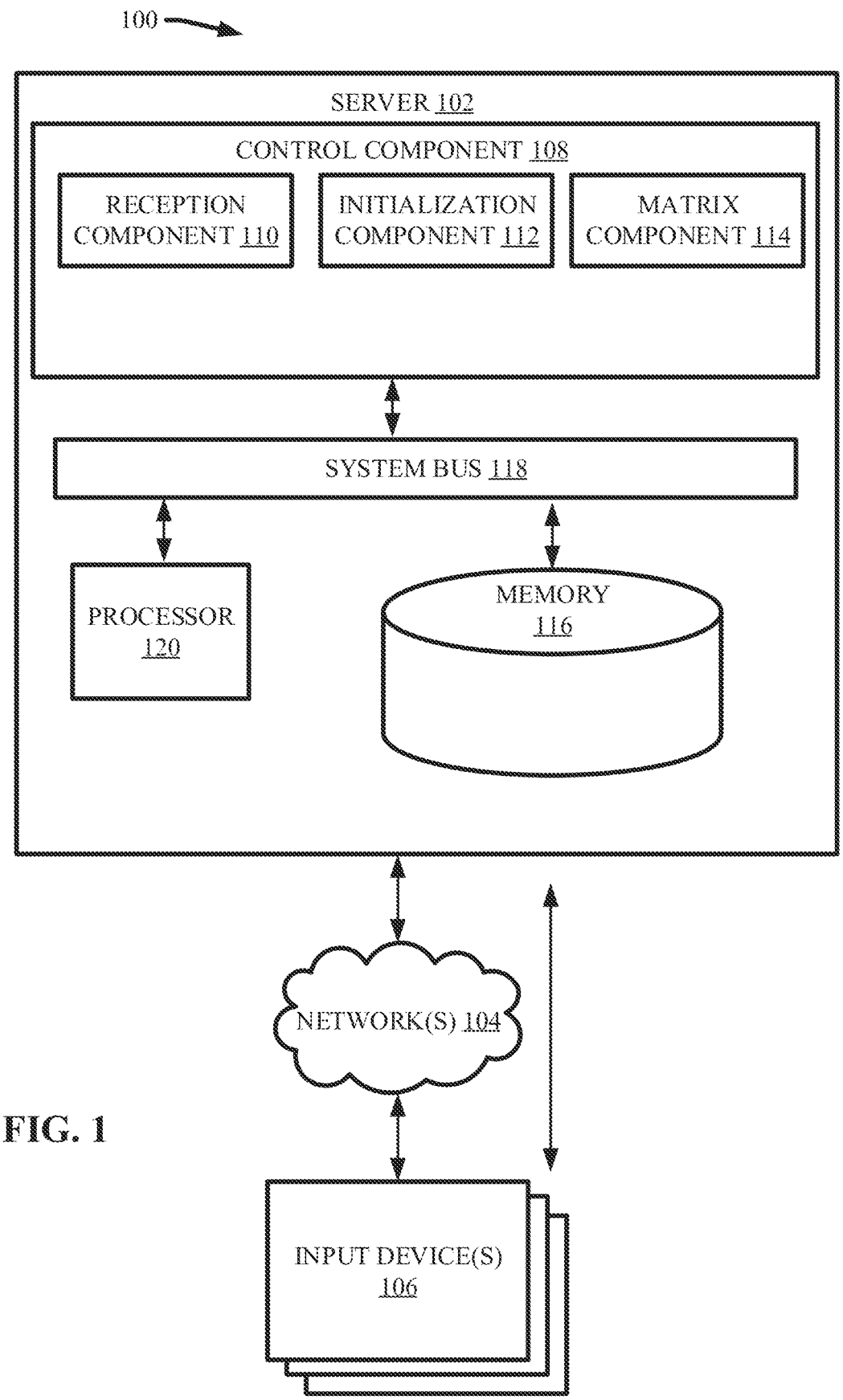
FIG. 1 illustrates a block diagram of an example, non-limiting system that can facilitate quantum computation of molecular excited states in the presence of Hamiltonian symmetries in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with conventional implementations of EoM method in computing molecular excited states; the present disclosure can be implemented to produce a solution to one or more of these problems in the form of a procedure to reduce the number of matrix entries computed during implementation of the EoM method, wherein the molecular Hamiltonian is mapped to a set of qubits possessing some Pauli symmetries. Various embodiments described herein can predict which entries of the EoM matrices will be zero, thereby saving a number of averaging experiments that scales quadratically with the number of excitation operators considered. An additional advantage of one or more embodiments described herein can include enabling an elimination of one or more qubits in mapped Hamiltonians.

Various embodiments of the present invention can be directed to computer processing systems, computer-implemented methods, apparatus and/or computer program products that facilitate the efficient, effective, and autonomous (e.g., without direct human guidance) quantum computation of molecular excited states in the presence of one or more Hamiltonian symmetries. One or more embodiments, can reduce the number of elements to be computed in an EoM method, and/or thereby reduce the number of qubits required from implementation of the EoM method. For example, various embodiments described herein can categorize excited operators of a mapped qubit Hamiltonian based on their commutation properties with one or more Hamiltonian symmetries (e.g., Pauli symmetries). Each set of excited operators that can commute with the one or more symmetries can be categorized into one sector, while each set of excited operators that can anti-commute with the one or more symmetries can be categorized into another sector. Further, matrix elements across sectors can be zero. In addition, for each pair of excited operators in the respective sectors a commutator can be generated based on one or more EoM matrix definitions and/or then be tapered with a tapering value.

The computer processing systems, computer-implemented methods, apparatus and/or computer program products employ hardware and/or software to solve problems that are highly technical in nature (e.g., quantum computation of molecular excited states in the presence of one or more Hamiltonian symmetries), that are not abstract and cannot be performed as a set of mental acts by a human. For example, various features of the embodiments described herein can be directed towards quantum computing, which can not be readily and/or efficiently performed by an individual's mental acts.

FIG. 1 illustrates a block diagram of an example, non-limiting system 100 that can facilitate implementation of one or more EoM methods on one or more quantum computing devices. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more input devices 106. The server 102 can comprise control component 108. The control component 108 can further comprise reception component 110, initialization component 112, and/or matrix component 114. Also, the server 102 can comprise or otherwise be associated with at least one memory 116. The server 102 can further comprise a system bus 118 that can couple to various components such as, but not limited to, the control component 108 and associated components, memory 116 and/or a processor 120. While a server 102 is illustrated in FIG. 1, in other embodiments, multiple devices of various types can be associated with or comprise the features shown in FIG. 1 (e.g., a quantum computing device). Further, the server 102 can communicate with a cloud computing environment depicted via the one or more networks 104.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the control component 108 can be provided on the one or more servers 102, it should be appreciated that the architecture of system 100 is not so limited. For example, the control component 108, or one or more components of control component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the server 102. For example, the one or more input devices 106 can send data to the reception component 110 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

A user of the system 100 can utilize the one or more input devices 106 and/or the one or more networks 104 to input one or more settings and/or commands into the system 100. For example, in the various embodiments described herein, a user of the system 100 can operate and/or manipulate the server 102 and/or associate components via the one or more input devices 106. Additionally, a user of the system 100 can utilize the one or more input devices 106 to display one or more outputs (e.g., displays, data, visualizations, and/or the like) generated by the server 102 and/or associate components. In various embodiments, a user of the system 100 can utilize the one or more input devices 106 and/or the one or more networks 104 to provide the server 102 (e.g., the control component 108) with EoM data (e.g., data that can be used to initiate one or more EoM methods). Example EoM data can include, but is not limited to: one or more mapped qubit Hamiltonians, one or more excitation operators, one or more reference states, one or more symmetries found from one or more mapped qubit Hamiltonians, one or more tapering values for a sector with the one or more reference states, a combination thereof, and/or the like.

The reception component 110 can be operably coupled to the one or more input devices 106 (e.g., via a direct electrical connection and/or via the one or more networks 104) and/or can receive the EoM data entered into the system 100. Further, the reception component 110 can share the EoM data with one or more components of the server 102, such as various components of the control component 108. For example, the reception component 110 can be operably coupled to one or more associated components of the control component 108 (e.g., via a direct electrical connection and/or via the one or more networks 104).

The initialization component 112 can categorize one or more excited operators based on one or more commutation properties of the excited operators with one or more Hamiltonian symmetries (e.g., particle symmetries and/or spatial symmetries). The one or more excited operators and/or symmetries analyzed by the initialization component 112 can be comprised within the EoM data received by the reception component 110. In various embodiments, the initialization component 112 can categorize the excited operators into a first sector or a second sector for each respective symmetry. The first sector can comprise one or more excited operators that can commute with the subject symmetry. In contrast, the second sector can comprise one or more excited operators that can anti-commute with the subject symmetry. Additionally, the one or more symmetries can be utilized to correlate one or more tapering values, which can be used by the control component 108 to taper the qubit Hamiltonian, as described later herein. In various embodiments, the one or more symmetries can be intrinsic to a subject molecule and/or can be derived from the subject qubit Hamiltonian.

For example, the initialization component 112 can categorize the one or more excited operators into two sectors in accordance with the following equations.

$$W_C = \{\hat{E}_\mu : [\hat{E}_\mu, S], [\hat{E}_\mu^\dagger, S] = 0\}$$

$$W_A = \{\hat{E}_\mu : [\hat{E}_\mu, S], [\hat{E}_\mu^\dagger, S] = 0\}$$

Wherein "E" can be a set of excitation operators with indexes "$E_\mu$" and/or "$E_\nu$", "S" can represent the subject symmetry, "$W_C$" can represent a set of excited operators that commute with the symmetry, and/or "$W_A$" can represent a set of excited operators that anti-commute with the symmetry. Thus, the excited operators of a mapped qubit Hamiltonian can be categorized into a first sector ("C") that can commute with a symmetry or a second sector ("A") that can anti-commute with a symmetry. The equations above exemplify categorization by the initialization component 112 with regards to one symmetry; however, the architecture of the initialization component 112 is not so limited. Wherein more than one symmetry is analyzed, additional sectors can be categorized by the initialization component 112. For example, the number of sectors categorized by the initialization component 112 can be equal to $2^N$ where "N" can represent the number of symmetries. For instance, wherein two symmetries are analyzed by the initialization component 112, the excited operators can be categorized into four sectors (e.g., {(commute, commute), (commute, anti-commute), (anti-commute, commute), (anti-commute, anti-commute)}). Thus, the initialization component 112 can perform one or more categorizations with regards to multiple symmetries. For example, the number of symmetries can range from 0 to X−1, wherein "X" can represent the number of subject qubits.

The matrix component 114 can generate one or more EoM matrices based on the categorized excited operators. For example, the matrix component 114 can generate one or more EoM matrices that comprise matrix elements from excited operators (e.g., "E") whose indexes (e.g., "$E_\mu$", "$E_\nu$") are in the same sector categorized by the initialization component 112. For instance, the matrix component 114 can generate one or more EoM matrices for excited operators whose both indexes commute with the subject symmetry (e.g., whose both indexes are comprised within the first sector "C" categorized by the initialization component 112). In another instance, the matrix component 114 can generate one or more EoM matrices for excited operators whose both indexes anti-commute with the subject symmetry (e.g., whose both indexes are comprised within the second sector "A" categorized by the initialization component 112).

In one or more embodiments, the matrix component 114 can avoid generating EoM matrices with excited operators that cross multiple sectors categorized by the initialization component 112. For example, the matrix component 114 can avoid generating one or more EoM matrices based on excited operators (e.g., "E") having a first index (e.g., "$E_\mu$") categorized within one sector (e.g., first sector "C") and a second index (e.g., "$E_\nu$") categorized within another sector (e.g., second sector "A"). EoM matrix elements that are based on excited operators that cross multiple sectors categorized by the initialization component 112 will be equal to zero; thereby, computation of such EoM matrix elements can be unnecessary as their result is known. Thus, by only generating EoM matrices from excited operators (e.g., "E") whose indexes (e.g., "$E_\mu$", "$E_\nu$") are in the same sector categorized by the initialization component 112 (e.g., by avoiding generation of EoM matrices from excited operators that cross multiple categorized sectors), the matrix component 114 can reduce the number of to-be-computed elements in the EoM matrices, as compared with conventional implementations of EoM methods.

Figure 2:
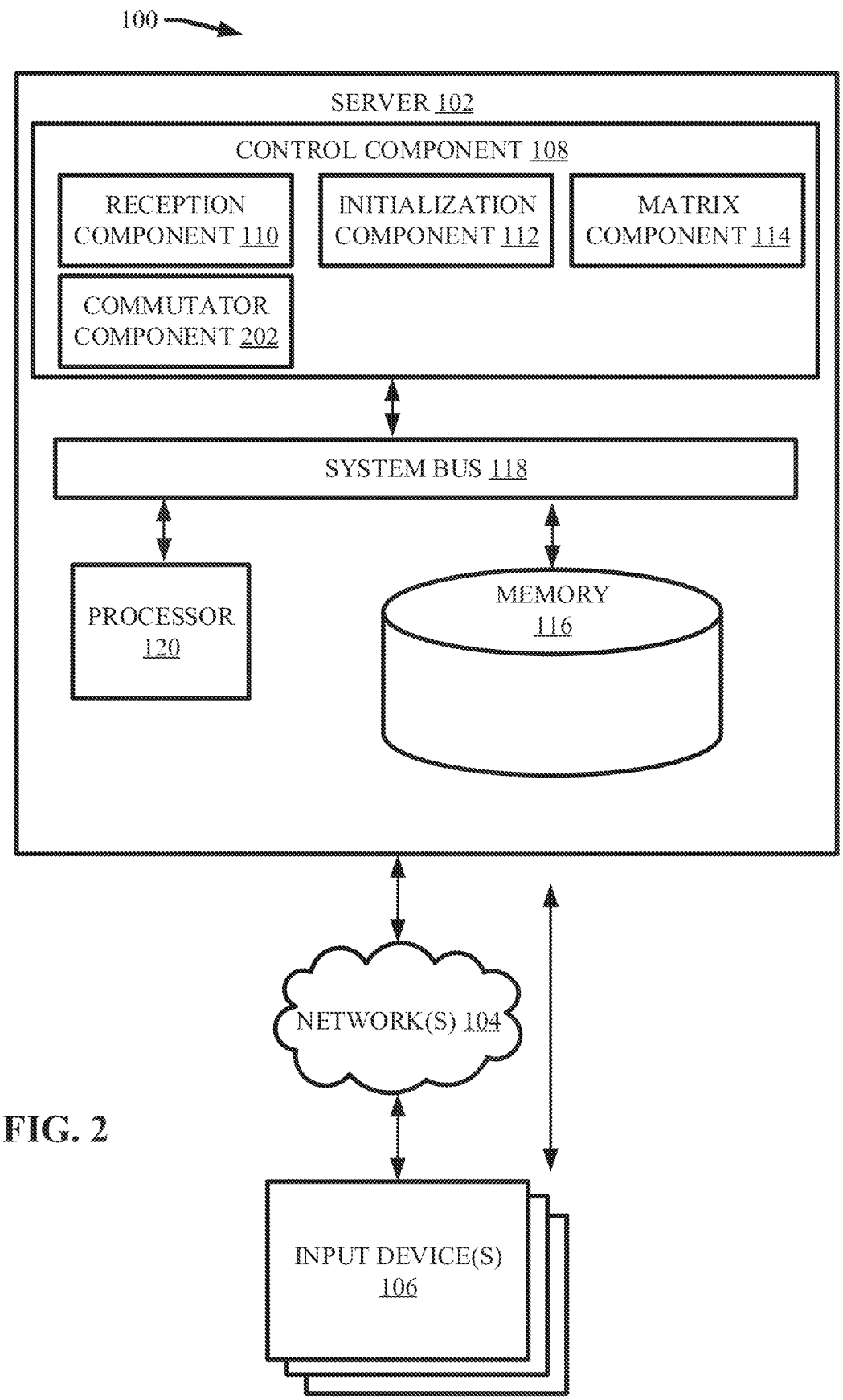
FIG. 2 illustrates a block diagram of an example, non-limiting system that can facilitate quantum computation of molecular excited states while reducing the number of evaluations of matrix elements necessary to build EoM matrices, as compared to conventional techniques, in accordance with one or more embodiments described herein.

FIG. 2 illustrates a diagram of the example, non-limiting system 100 further comprising commutator component 202 in accordance with one or more embodiments described herein. Repetitive description of like elements employed in other embodiments described herein is omitted for sake of brevity. The commutator component 202 can generate one or more commutators based on the one or more EoM matrices generated by the matrix component 114.

For example, the commutator component 202 can generate one or more commutators in accordance with the following definitions.

$$M_{\mu\nu} = \langle 0 | [(\hat{E}_\mu)^\dagger, \hat{H}, \hat{E}_\nu] | 0 \rangle,$$

$$Q_{\mu\nu} = -\langle 0 | [(\hat{E}_\mu)^\dagger, \hat{H}, (\hat{E}_\nu)^\dagger] | 0 \rangle,$$

$$V_{\mu\nu} = \langle 0 | [(\hat{E}_\mu)^\dagger, \hat{E}_\nu] | 0 \rangle,$$

$$W_{\mu\nu} = -\langle 0 | [(\hat{E}_\mu)^\dagger, (\hat{E}_\nu)^\dagger] | 0 \rangle.$$

Wherein "H" can be a mapped qubit Hamiltonian, "E" can be a set of excitation operators with indexes "$E_\mu$" and/or "$E_\nu$", "|0>" can represent a reference state from the mapped qubit Hamiltonian. For example, the reference state can be a ground energy state of the subject molecule, wherein an energy difference between a subject state and the reference state can be an excited state of the molecule. For each pair of excited operators (e.g., "$E_\mu$" and "$E_\nu$") in a categorized sector (e.g., set "$W_C$" or "$W_A$") the commutator component 202 can generate one or more commutators (e.g., $M_{\mu\nu}$, $Q_{\mu\nu}$, $V_{\mu\nu}$, and/or $W_{\mu\nu}$) based on the EoM matrix definitions provided above. Thus, as described above with regards to the matrix component 114, the commutator component 202 can generate one or more commutators based on excited operators that have both indexes within the same categorization.

Figure 3:
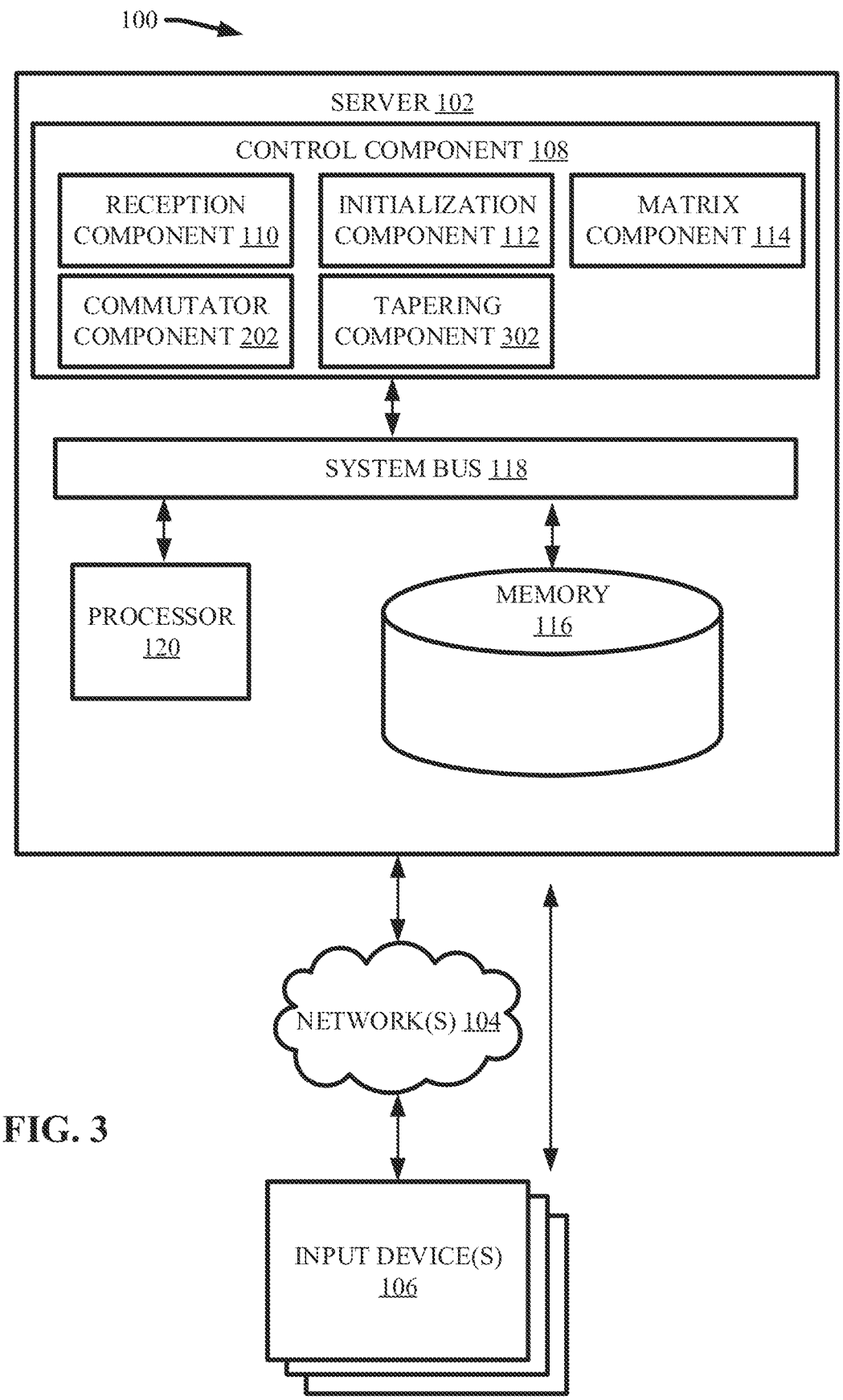
FIG. 3 illustrates a block diagram of an example, non-limiting system that can facilitate computation of molecular excited states while reducing the number of qubits to run EoM methods on a quantum computer, as compared to conventional techniques, in accordance with one or more embodiments described herein.

FIG. 3 illustrates a diagram of the example, non-limiting system 100 further comprising tapering component 302 in accordance with one or more embodiments described herein. Repetitive description of like elements employed in other embodiments described herein is omitted for sake of brevity. The tapering component 302 can taper the number of qubits used to run the commutators generated by the commutator component 202 based on a tapering value.

The tapering value can delineate the symmetry sector in which the reference state of the mapped qubit Hamiltonian was located. For instance, each energy state of the mapped qubit Hamiltonian can be located in respective sectors of the subject symmetry, wherein the tapering value can represent the sector of the subject symmetry to which the reference state (e.g., "|0>") belongs. The tapering value can be, for example, included in the EoM data entered into the system 100. The tapering component 302 can utilize the tapering value to taper the one or more commutators generated by the commutator component 202 to eliminate one or more qubits assignment. For example, the tapering component 302 can taper a qubit Hamiltonian after generation of the one or more commutators by multiplying the tapering value with the coefficient in the subject qubit Hamiltonian to assure the tapered Hamiltonian has the correct sign to the reference state. Thereby, the tapering component 302 can reduce the number of qubits required to run the one or more commutators (e.g., generated by the commutator component 202) and/or EoM matrices (e.g., generated by the matrix component 114) on one or more quantum computing devices.

Figure 4:
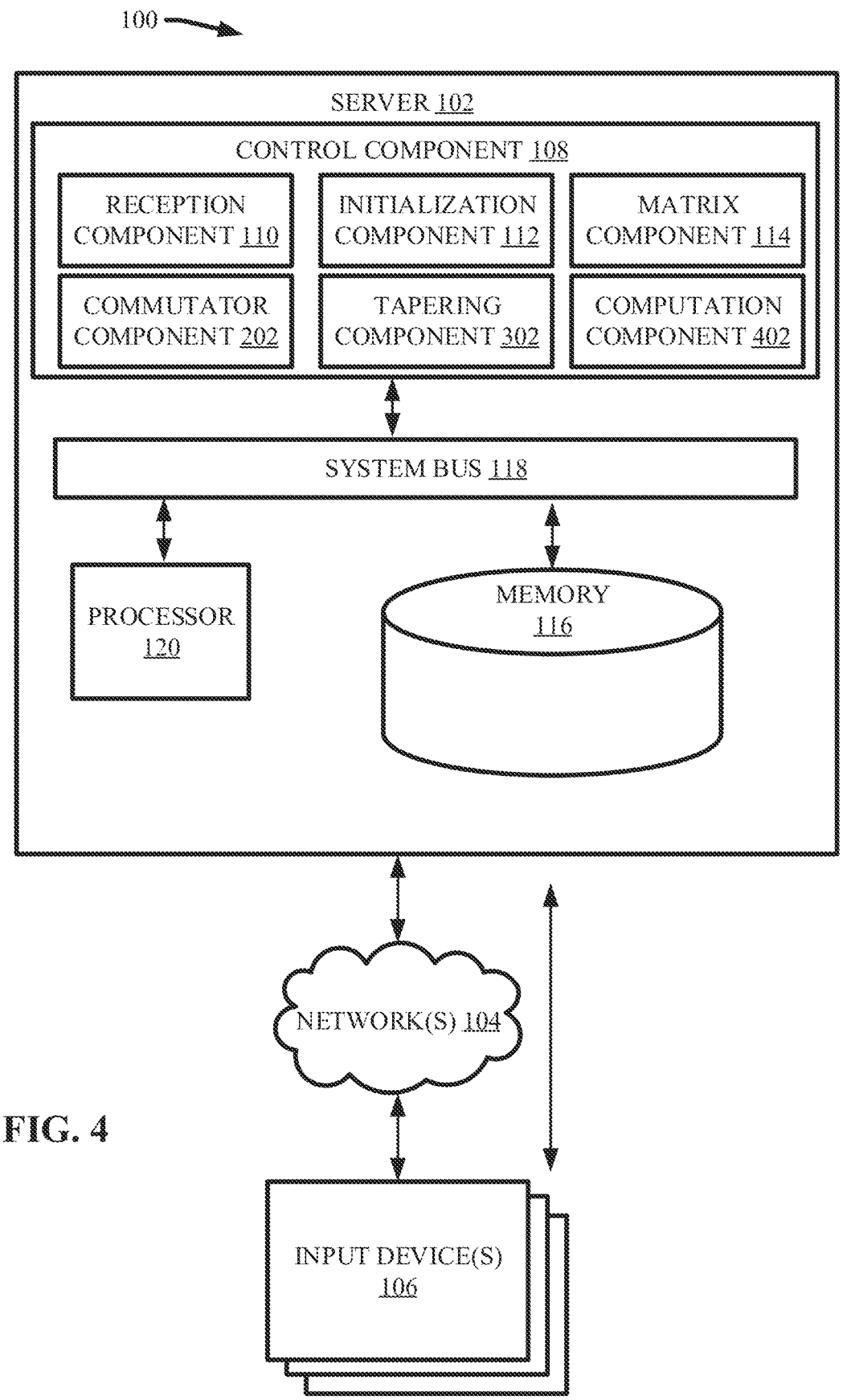
FIG. 4 illustrates a block diagram of an example, non-limiting system that can facilitate quantum computation of molecular excited states in the presence of Hamiltonian symmetries in accordance with one or more embodiments described herein.

FIG. 4 illustrates a diagram of the example, non-limiting system 100 further comprising computation component 402 in accordance with one or more embodiments described herein. Repetitive description of like elements employed in other embodiments described herein is omitted for sake of brevity. The computation component 402 can solve a secular equation of the EoM method based on the one or more commutators (e.g., tapered by the tapering component 302) and/or EoM matrices generated by the various components (e.g., the initialization component 112, the matrix component 114, and/or the commutator component 202) of the control component 108.

For example, the computation component 402 can utilize the generated commutators (e.g., tapered commutators) and/or EoM matrices to solve the following eigenvalue equation (e.g., "Equation 1") based on the EoM matrix definitions described herein.

$$\begin{pmatrix} M & Q \\ Q^* & M^* \end{pmatrix} \begin{pmatrix} X_n \\ Y_n \end{pmatrix} = E_{0n} \begin{pmatrix} V & W \\ -W^* & -V^* \end{pmatrix} \begin{pmatrix} X_n \\ Y_n \end{pmatrix} \quad (1)$$

Wherein "*" can denote a complex-conjugate, and/or "$E_{0n}$" can be an energy gap between the "n-th" excited state to the reference state.

Advantageous, the various embodiments of the system 100 described herein can reduce the number of qubits needed to run a EoM method on a quantum computer and/or the number of evaluations of matrix elements necessary to build the matrices of the EoM method, as compare to conventional techniques. For example, for a hydrogen molecule ("$H_2$"), the system 100 can enable the use of 1 qubit to perform the EoM method rather than the 4 qubits required by conventional techniques. By utilizing fewer qubits, the system 100 can facilitate operation of the EoM method on quantum circuits with a larger number of gates than otherwise available in conventional techniques; thereby offering the possibility of exploring more complex wavefunction ansatzes in a variational quantum eigensolver approach. In another example, for the lithium hydride ("LiH") molecule, the system 100 can reduce the number of entry evaluations by a factor of three, as compared with conventional techniques. For a generic molecule, the number of saved entry evaluations by the system 100, as compared to conventional techniques, can scale quadratically with the number of excited states considered.

Figure 5:
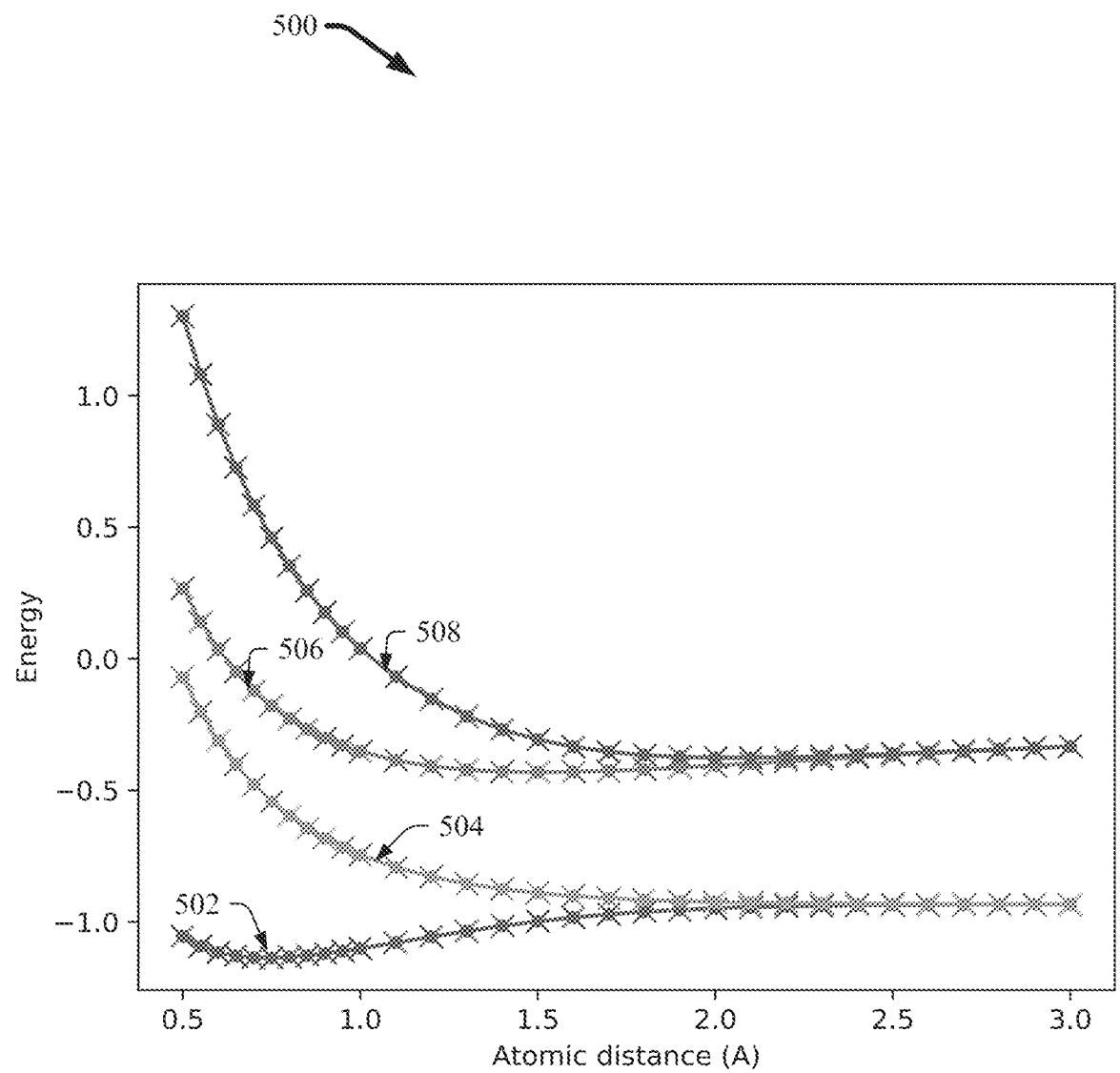
FIG. 5 illustrates a diagram of an example, non-limiting graph that can depict the efficacy of one or more systems that can facilitate quantum computation of molecular excited states in the presence of Hamiltonian symmetries in accordance with one or more embodiments described herein.

FIG. 5 illustrates a diagram of an example, non-limiting graph 500 that can depict the efficacy of the system 100 with regards to the dissociation profile of $H_2$. Repetitive description of like elements employed in other embodiments described herein is omitted for sake of brevity. As shown in FIG. 5, the solid lines can represent molecular energy states derived using conventional techniques and 2 qubits. For example, the first line 502 can represent the 0-th excited state, the second line 504 can represent the $1^{st}$ excited state, the third line 506 can represent the $2^{nd}$ excited state, and the fourth line can represent the $3^{rd}$ excited state. Additionally, the filled circles (e.g., whose position is further delineated with an "x") can represent excited states as determined by the system 100 using 1 qubit. As exemplified by graph 500, the system 100 described herein can achieve the same results as conventional techniques while using fewer qubits to perform the quantum computations.

Figure 6:
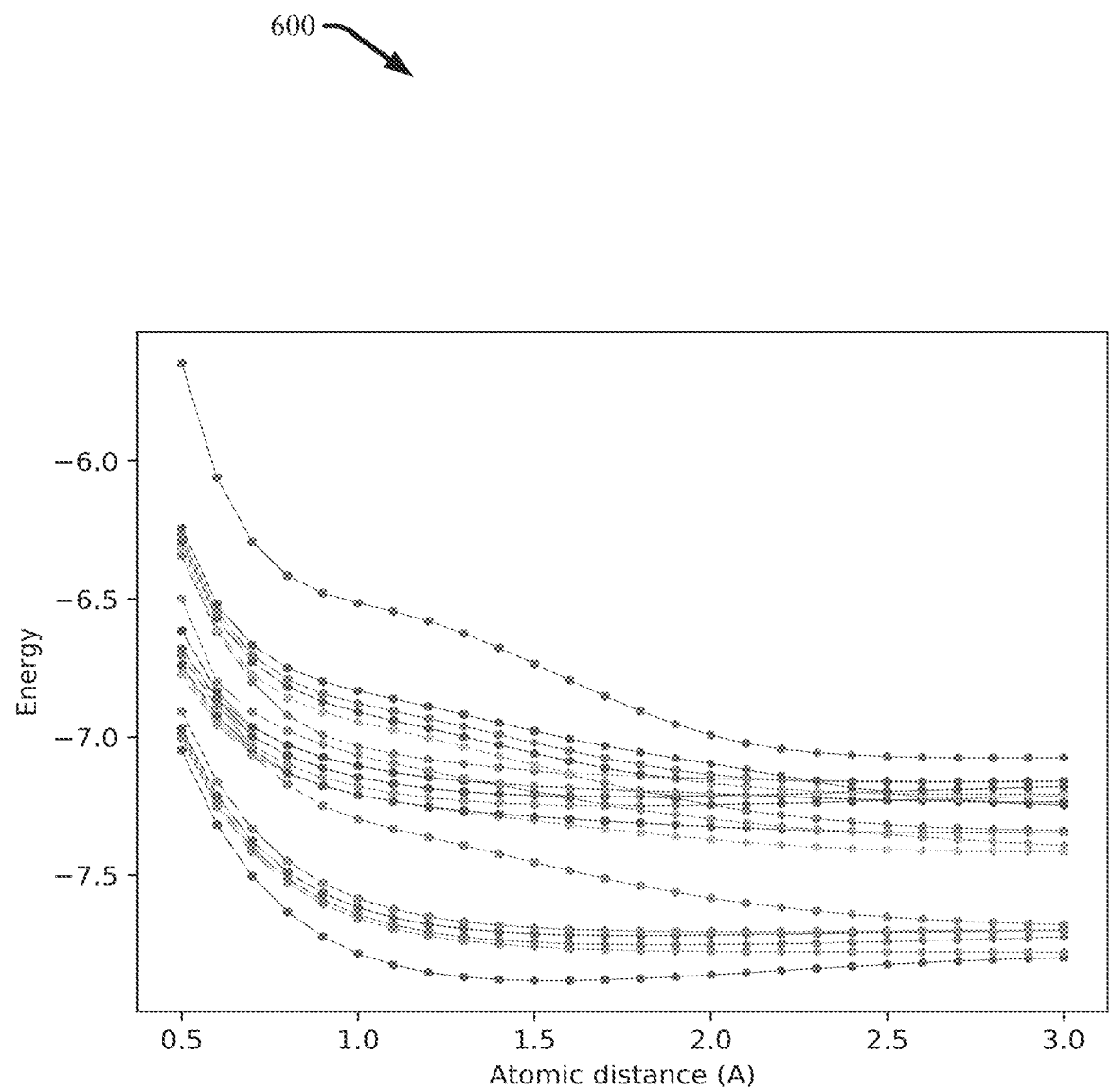
FIG. 6 illustrates a diagram of an example, non-limiting graph that can depict the efficacy of one or more systems that can facilitate quantum computation of molecular excited states in the presence of Hamiltonian symmetries in accordance with one or more embodiments described herein.

FIG. 6 illustrates a diagram of an example, non-limiting graph 600 that can depict the efficacy of the system 100 with regards to the dissociation profile of LiH. Repetitive description of like elements employed in other embodiments described herein is omitted for sake of brevity. As shown in FIG. 6 the solid lines can represent 24 respective molecular excited states derived using conventional techniques and 8 qubits, wherein 300 elements are comprised within the EoM matrices. Further, the filled circles (e.g., whose position is further delineated with an "x") can represent the respective excited states as determined by system 100 using 6 qubits, wherein 100 elements are comprised within the EoM matrices. As exemplified by graph 600, the system 100 described herein can achieve the same results as conventional techniques while using fewer qubits and fewer computations (e.g., fewer number of evaluations of matrix elements); thereby increasing the speed and efficiency of the quantum computing used to determine the molecular excited states.

FIG. 7 illustrates a flow diagram of an example, non-limiting method 700 that can facilitate quantum computation of molecular excited states in the presence of Hamiltonian symmetries in accordance with one or more embodiments described herein. Repetitive description of like elements employed in other embodiments described herein is omitted for sake of brevity.

At 702, the method 700 can comprise categorizing, by a system 100 (e.g., via the initialization component 112) operatively coupled to a processor 120, a plurality of excited operators from a mapped qubit Hamiltonian into one or more sectors based on a commutation property of the plurality of excited operators with a symmetry from the mapped qubit Hamiltonian. For example, the excited operators can comprise two indexes, respectively, which can be categorized by the system 100 into a first sector or a second sector. Excited operator indexes that can commute with the subject symmetry can be categorized into the first sector, while excited operator indexes that can anti-commute with the subject symmetry can be categorized into the second sector. For instance, the categorizing at 702 can comprise forming the first set ("$W_C$") of excited operators and/or the second set ("$W_A$") of excited operators described herein.

At 704, the method 700 can comprise generating, by the system 100 (e.g., via the matrix component 114 and/or the commutator component 202), one or more EoM matrices from one or more excited operators from the plurality of excited operators based on the categorizing at 702. For example, the one or more EoM matrices can be generated from excited operators that have both indexes (e.g., "$E_\mu$" and/or "$E_\nu$") within the same sector categorized at 702. Matrix elements derived from excited operators that have respective indexes from different sectors can equate to zero, and thereby the generating at 704 can avoid analyzing such excited operators for EoM matrix formation. Thus, the categorizing at 702 can guide the EoM matrix formation at 704 to efficiently select excited operators that can derive EoM matrixes that equate to an integer other than zero, while avoiding analyzation of excited operators that can derive EoM matrixes that can equate to known outcomes (e.g., zero). Thereby, method 700 can advantageously reduce the number of evaluations of matrix elements necessary to build the one or more EoM matrices, as compared to conventional techniques.

FIG. 8 illustrates a flow diagram of an example, non-limiting method 800 that can facilitate quantum computation of molecular excited states in the presence of Hamiltonian symmetries in accordance with one or more embodiments described herein. Repetitive description of like elements employed in other embodiments described herein is omitted for sake of brevity.

At 802, the method 800 can comprise categorizing, by a system 100 (e.g., via the initialization component 112) operatively coupled to a processor 120, a plurality of excited operators from a mapped qubit Hamiltonian into one or more sectors based on a commutation property of the plurality of excited operators with a symmetry from the mapped qubit Hamiltonian. For example, the excited operators can respectively comprise two indexes, which can be categorized by the system 100 into a first sector or a second sector. Excited operator indexes that can commute with the subject symmetry can be categorized into the first sector, while excited operator indexes that can anti-commute with the subject symmetry can be categorized into the second sector. For instance, the categorizing at 702 can comprise forming the first set ("$W_C$") of excited operators and/or the second set ("$W_A$") of excited operators described herein.

At 804, the method 800 can comprise generating, by the system 100 (e.g., via the matrix component 114 and/or the commutator component 202), one or more EoM matrices from one or more excited operators from the plurality of excited operators based on the categorizing at 802. For example, the one or more EoM matrices can be generated from excited operators that have both indexes (e.g., "$E_\mu$" and/or "$E_\nu$") within the same sector categorized at 802. Matrix elements derived from excited operators that have respective indexes from different sectors can equate to zero, and thereby the generating at 804 can avoid analyzing such excited operators for EoM matrix formation. Thus, the categorizing at 802 can guide the EoM matrix formation at 804 to efficiently select excited operators that can derive EoM matrixes that equate to an integer other than zero, while avoiding analyzation of excited operators that can derive EoM matrixes that can equate to known outcomes (e.g., zero).

At 806, the method 800 can comprise generating, by the system 100 (e.g., via the commutator component 202), one or more commutators based on the one or more EoM matrices. For example, the one or more commutators can be generated in accordance with the various commutator definitions described herein.

At 808, the method 800 can comprise tapering, by the system 100 (e.g., via the tapering component 302), a number of qubits that execute the one or more commutators based on a tapering value that regards the location of a reference state of the mapped qubit Hamiltonian in relation to the subject symmetry. For example, the tapering value can delineate a symmetry sector of the mapped qubit Hamiltonian that belongs to the reference state. Advantageously, the method 800 can reduce the number of qubits required for executing the quantum the EoM matrices and/or commutators on a quantum computing device.

At 810, the method 800 can comprise solving, by the system 100 (e.g., via the computation component 402), one or more eigenvalue equations based on the one or more commutators. For example, the solving at 810 can be performed with regards to Equation 1 described herein. In various embodiments, the one or more eigenvalue equations can be solved at 810 using a tapered number of qubits as a result of the tapering at 808.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
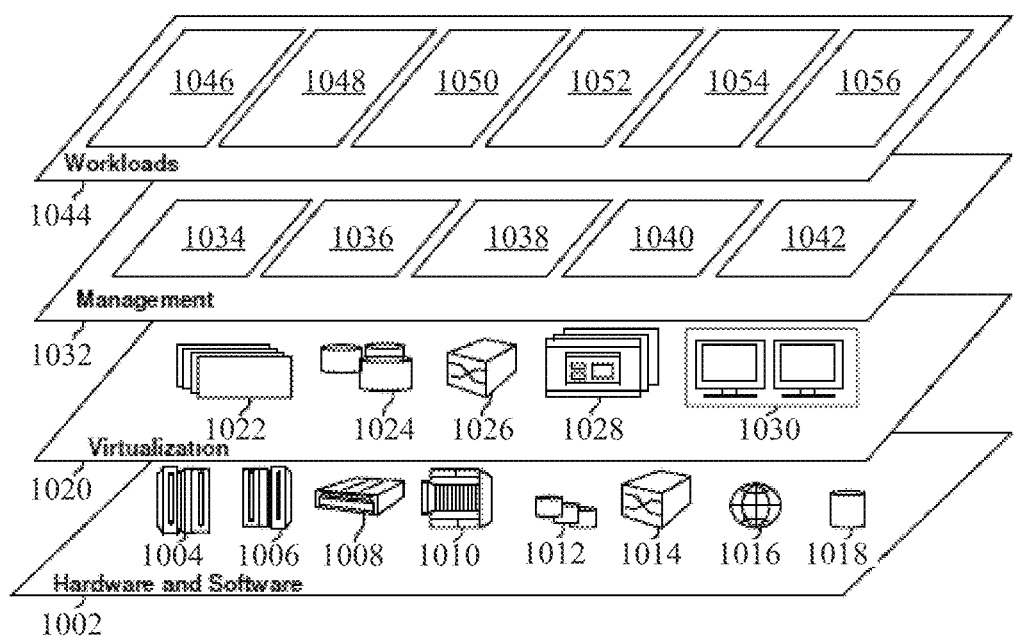
FIG. 10 depicts abstraction model layers in accordance with one or more embodiments described herein

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Referring now to FIG. 10, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 10 are intended to be illustrative only and embodiments of the invention are not limited thereto. As depicted, the following layers and corresponding functions are provided.

Hardware and software layer 1002 includes hardware and software components. Examples of hardware components include: mainframes 1004; RISC (Reduced Instruction Set Computer) architecture based servers 1006; servers 1008; blade servers 1010; storage devices 1012; and networks and networking components 1014. In some embodiments, software components include network application server software 1016 and database software 1018.

Virtualization layer 1020 provides an abstraction layer from which the following examples of virtual entities may be provided: virtual servers 1022; virtual storage 1024; virtual networks 1026, including virtual private networks; virtual applications and operating systems 1028; and virtual clients 1030.

In one example, management layer 1032 may provide the functions described below. Resource provisioning 1034 provides dynamic procurement of computing resources and other resources that are utilized to perform tasks within the cloud computing environment. Metering and Pricing 1036 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1038 provides access to the cloud computing environment for consumers and system administrators. Service level management 1040 provides cloud computing resource allocation and management such that required service levels are met. Service Level Agreement (SLA) planning and fulfillment 1042 provide pre-arrangement for, and procurement of, cloud computing resources for which a future requirement is anticipated in accordance with an SLA.

Figure 9:
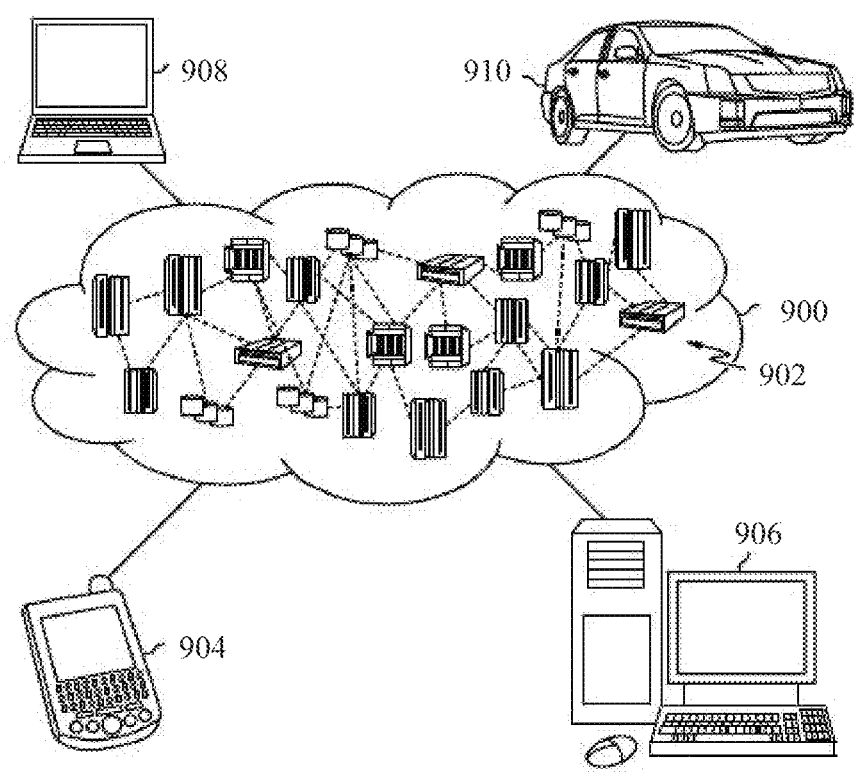
FIG. 9 depicts a cloud computing environment in accordance with one or more embodiments described herein.

Workloads layer 1044 provides examples of functionality for which the cloud computing environment may be utilized. Examples of workloads and functions which may be provided from this layer include: mapping and navigation 1046; software development and lifecycle management 1048; virtual classroom education delivery 1050; data analytics processing 1052; transaction processing 1054; and EoM computation 1056. Various embodiments of the present invention can utilize the cloud computing environment described with reference to FIGS. 9 and 10 to compute one or more features of an EoM method (e.g., one or more EoM matrices and/or commutators) to determine a molecular excited state. For example, one or more components of the system 100 (e.g., the initialization component 112 and/or the matrix component 114) can be executed on a quantum computer whereas one or more other components of the system 100 (e.g., the computation component 402) can be executed on a classical computer, wherein a cloud computing environment can facilitate communication between the quantum computer and classical computer and/or performance efficiency of the quantum computer and/or the classical computer.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 11:
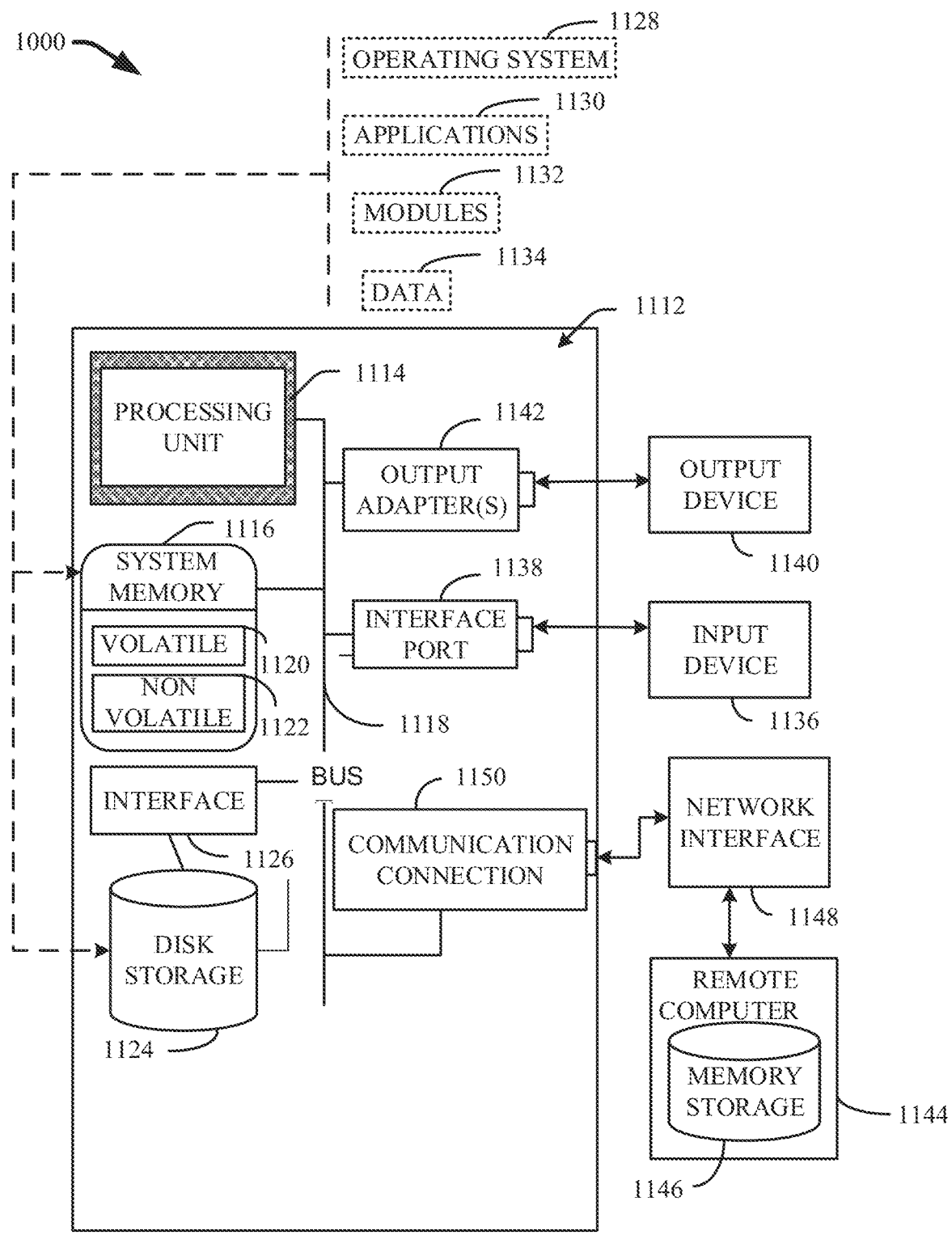
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity. With reference to FIG. 11, a suitable operating environment 1100 for implementing various aspects of this disclosure can include a computer 1112. The computer 1112 can also include a processing unit 1114, a system memory 1116, and a system bus 1118. The system bus 1118 can operably couple system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, can be stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface can be used, such as interface 1126. FIG. 11 also depicts software that can act as an intermediary between users and the basic computer resources described in the suitable operating environment 1100. Such software can also include, for example, an operating system 1128. Operating system 1128, which can be stored on disk storage 1124, acts to control and allocate resources of the computer 1112. System applications 1130 can take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through one or more input devices 1136. Input devices 1136 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1114 through the system bus 1118 via one or more interface ports 1138. The one or more Interface ports 1138 can include, for example, a serial port, a parallel port, a game port, and a universal serial bus (USB). One or more output devices 1140 can use some of the same type of ports as input device 1136. Thus, for example, a USB port can be used to provide input to computer 1112, and to output information from computer 1112 to an output device 1140. Output adapter 1142 can be provided to illustrate that there are some output devices 1140 like monitors, speakers, and printers, among other output devices 1140, which require special adapters. The output adapters 1142 can include, by way of illustration and not limitation, video and sound cards that provide a means of connection between the output device 1140 and the system bus 1118. It should be noted that other devices and/or systems of devices provide both input and output capabilities such as one or more remote computers 1144.

Computer 1112 can operate in a networked environment using logical connections to one or more remote computers, such as remote computer 1144. The remote computer 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer 1144. Remote computer 1144 can be logically connected to computer 1112 through a network interface 1148 and then physically connected via communication connection 1150. Further, operation can be distributed across multiple (local and remote) systems. Network interface 1148 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like.

The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor, operably coupled to the memory, and that executes the computer executable components stored in the memory, wherein the computer executable components comprise:
an initialization component that categorizes into sectors a plurality of excited operators of a mapped qubit Hamiltonian, wherein the categorizing is based on a commutation property of the plurality of excited operators combined with a symmetry of the mapped qubit Hamiltonian;
a matrix component that generates one or more equation of motion matrices only from one or more excited operators from the plurality of excited operators, based on the sectors categorized by the initialization component;
an operation component that operates on one or more qubits of a quantum circuit; and
a computation component that computes, via the quantum circuit, a molecular excited state using the equation of motion matrices.

2. The system of claim 1, wherein a first sector from the sectors comprises a first pair of excited operators from the plurality of excited operators, wherein the first pair of excited operators commute with the symmetry, wherein a second sector from the sectors comprises a second pair of excited operators from the plurality of excited operators, and wherein the second pair of excited operators anti-commute with the symmetry.

3. The system of claim 2, wherein the matrix component generates the equation of motion matrices in the first sector based on the first pair of excited operators, and wherein the matrix component generates another equation of motion matrix in the second sector based on the second pair of excited operators.

4. The system of claim 3, further comprising:
a commutator component that generates a first commutator based on the equation of motion matrices and a second commutator based on the another equation of motion matrix.

5. The system of claim 4, further comprising:
a tapering component that tapers a number of qubits that execute the first commutator based on a tapering value that regards a location of a reference state of the mapped qubit Hamiltonian in relation to the symmetry, wherein the tapering component further tapers a number of second qubits that execute the second commutator based on the tapering value.

6. The system of claim 5, wherein the computation component solves an eigenvalue equation based on the first commutator and the second commutator to determine the molecular excited state.

7. The system of claim 1, wherein the system minimizes a number of evaluations of matrix elements to generate the equation of motion matrices.

8. The system of claim 1, wherein the matrix component further generates the one or more equation of motion matrices only from the one or more excited operators, wherein the one or more excited operators have indexes in the sectors categorized by the initialization component.

9. A computer-implemented method, comprising:
categorizing, by a system operatively coupled to a processor, a plurality of excited operators of a mapped qubit Hamiltonian into sectors, wherein the categorizing is based on a commutation property of the plurality of excited operators combined with a symmetry of the mapped qubit Hamiltonian;
generating, by the system, one or more equation of motion matrices only from one or more excited operators from the plurality of excited operators, based on the categorizing;
operating, by the system, on one or more qubits of a quantum circuit; and
computing, by the system, via the quantum circuit, a molecular excited state using the equation of motion matrices.

10. The computer-implemented method of claim 9, wherein a first sector from the sectors comprises a first pair of excited operators from the plurality of excited operators, wherein the first pair of excited operators commute with the symmetry, wherein a second sector from the sectors comprises a second pair of excited operators from the plurality of excited operators, and wherein the second pair of excited operators anti-commute with the symmetry.

11. The computer-implemented method of claim 10, further comprising:
generating, by the system, another equation of motion matrix in the second sector based on the second pair of excited operators, wherein the generating the equation of motion matrices are based on the first pair of excited operators.

12. The computer-implemented method of claim 10, further comprising:
generating, by the system, a commutator based on the equation of motion matrices.

13. The computer-implemented method of claim 12, further comprising:
tapering, by the system, a number of qubits that execute the commutator based on a tapering value that regards a location of a reference state of the mapped qubit Hamiltonian in relation to the symmetry.

14. The computer-implemented method of claim 13, further comprising:
solving, by the system, an eigenvalue equation based on the commutator.

15. A computer program product for quantum computation of a molecular excited state in a presence of a Hamiltonian symmetry, the computer program product comprising a computer readable storage medium having program instructions embodied therewith, the program instructions executable by a processor to cause the processor to:
categorize, by a system operatively coupled to the processor, a plurality of excited operators of a mapped qubit Hamiltonian into sectors, wherein the categorizing is based on a commutation property of the plurality of excited operators combined with a symmetry of the mapped qubit Hamiltonian;
generate, by the system, one or more equation of motion matrices only from one or more excited operators from the plurality of excited operators, based on the categorization of the plurality of excited operators into the sectors;
operate, by the system, on one or more qubits of a quantum circuit; and
compute, by the system, via the quantum circuit, a molecular excited state using the equation of motion matrices.

16. The computer program product of claim 15, wherein a first sector from the sectors comprises a first pair of excited operators from the plurality of excited operators, wherein the first pair of excited operators commute with the Hamiltonian symmetry, wherein a second sector from the sectors comprises a second pair of excited operators from the plurality of excited operators, and wherein the second pair of excited operators anti-commute with the Hamiltonian symmetry.

17. The computer program product of claim 16, wherein the program instructions further cause the processor to:
generate, by the system, another equation of motion matrix in the second sector based on the second pair of excited operators, and wherein the equation of motion matrices are based on the first pair of excited operators.

18. The computer program product of claim 17, wherein the program instructions further cause the processor to:
generate, by the system, a commutator based on the equation of motion matrices; and
taper, by the system, a number of qubits that execute the commutator based on a tapering value that regards a location of a reference state of the mapped qubit Hamiltonian in relation to the symmetry.

19. The computer program product of claim 18, wherein the system generates the sectors in a cloud computing environment.

20. A system, comprising:
a memory that stores computer executable components;
a processor, operably coupled to the memory, and that executes the computer executable components stored in the memory, wherein the computer executable components comprise:
a control component that generates one or more equation of motion matrices only from one or more excited operators of a mapped qubit Hamiltonian, based on a symmetry that is intrinsic to the mapped qubit Hamiltonian;
an operation component that operates on one or more qubits of a quantum circuit; and
a computation component that computes, via the quantum circuit, a molecular excited state using the equation of motion matrices.

21. The system of claim 20, further comprising:
an initialization component that categorizes into sectors the one or more excited operators, wherein the categorizing is based on a commutation property of the one or more excited operators and on the symmetry.

22. The system of claim 21, wherein the one or more excited operators are categorized by the initialization component into a common sector.

23. A computer program product for quantum computation of a molecular excited state in a presence of a Hamiltonian symmetry, the computer program product comprising a computer readable storage medium having program instructions embodied therewith, the program instructions executable by a processor to cause the processor to:
generate, by a system operatively coupled to the processor, one or more equation of motion matrices only from excited operators of a mapped qubit Hamiltonian, based on the Hamiltonian symmetry, which is intrinsic to the mapped qubit Hamiltonian;
operate, by the system, on one or more qubits of a quantum circuit; and
compute, by the system, via the quantum circuit, a molecular excited state using the equation of motion matrices.

24. The computer program product of claim 23, wherein the program instructions further cause the processor to:
categorize, by the system, the excited operators into sectors, wherein the categorizing is based on a commutation property of the excited operators and on the Hamiltonian symmetry.

25. The computer program product of claim 24, a first excited operator from the excited operators and a second excited operator from the excited operators are categorized, by the system, into a first sector from the sectors.

* * * * *